S. AND J. GUMULA.
FOOD BOILER.
APPLICATION FILED DEC. 6, 1919.

1,362,862.

Patented Dec. 21, 1920.

INVENTOR
STANLEY GUMULA &
JOHN GUMULA
BY Joseph J. O'Brien
ATTORNEY

UNITED STATES PATENT OFFICE.

STANLEY GUMULA, OF CHICOPEE, AND JOHN GUMULA, OF LUDLOW, MASSACHUSETTS.

FOOD-BOILER.

1,362,862. Specification of Letters Patent. Patented Dec. 21, 1920.

Application filed December 6, 1919. Serial No. 343,123.

*To all whom it may concern:*

Be it known that we, STANLEY GUMULA and JOHN GUMULA, citizens of Poland, residing at Chicopee and Ludlow, in the county of Hampden and State of Massachusetts, have invented certain new and useful Improvements in Food-Boilers, of which the following is a specification.

This invention relates to improvements in boilers for milk and other liquid foods and its leading object is to provide a device of simple construction which will prevent the liquid food from boiling over the vessel and also prevent burning while being cooked or boiled.

The invention is embodied in a device which includes a vessel having a double bottom and an inverted funnel shaped member disposed within the vessel and having a distributing plate arranged on its head for causing the milk or other liquid food to flow in a thin stream outwardly toward the wall of the vessel, and also includes a baffle to prevent a violent splashing of the milk or liquid food in the form of geyser like streams.

With the above and other objects in view this invention relates to certain new and useful constructions, combinations and arrangements of parts, clearly described in the following specification and fully illustrated in the accompanying drawings, in which.

Figure 1:
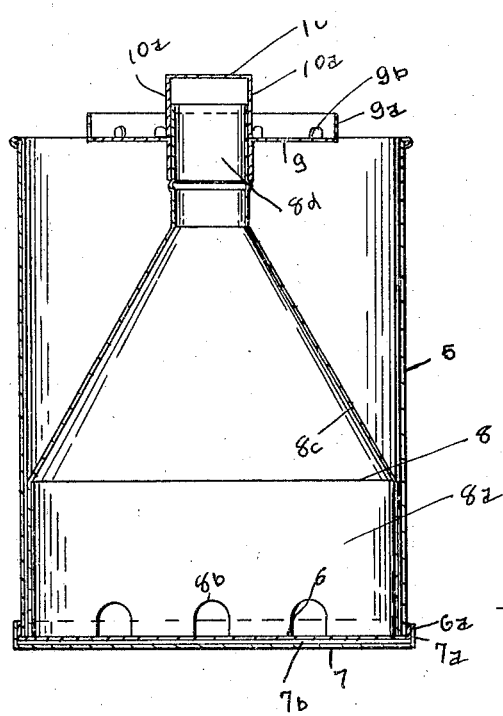
Figure 1 is a vertical sectional view.
Figure 3:
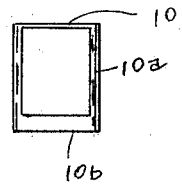
Fig. 3 is a detail side elevation of the baffle plate and its connection with the upper end of the conical member.
Figure 2:
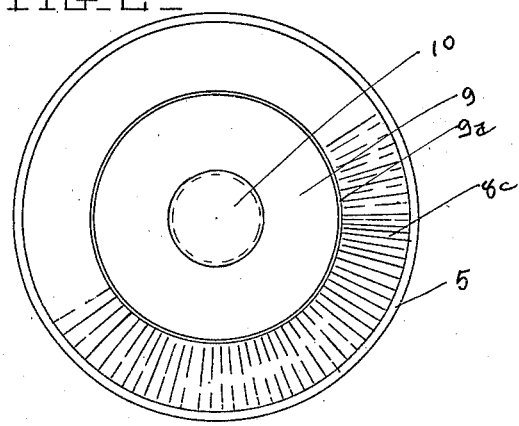
Fig. 2 is a top plan view.

Referring to the accompanying drawings 5 designates a vessel having a bottom 6 secured thereto by a flange $6^a$ constituting the inner bottom and a second bottom 7 secured on the flange $6^a$ by a corresponding flange $7^a$ and slightly spaced therefrom to provide a closed air space $7^b$ between the inner bottom 6 and the outer bottom 7. Otherwise the vessel 5 is of ordinary construction.

Within the vessel 5 an inverted funnel shaped member 8 is disposed which includes the cylindrical portion $8^a$ having recesses or openings $8^b$ formed in its bottom edge portion and an upstanding cone shaped portion $8^c$ which terminates in a centrally located spout $8^d$. On this spout $8^d$ a distributing ring 9 is mounted so as to occupy a horizontal position and this ring is provided with an external upstanding flange $9^a$ having radially spaced openings $9^b$ therein through which the milk will flow after passing upwardly through the spout $8^d$. Above the spout $8^d$ a baffle 10 is supported by means of the vertical arms $10^a$ which are connected to each other by the ring $10^b$, which has a slip fit on the spout $8^d$, so that said baffle plate 10 may be detached from said spout for the purposes of cleansing.

When the vessel 5 has been filled with milk or other liquid food and placed over a fire and the liquid food or milk brought to a proper temperature a circular circulatory movement will be created through the member 8 and over the distributing plate 9 and back into the vessel, which will result in uniform cooking of the food and prevent waste thereof by reason of boiling over. The milk or food flowing over the distributer plate 10 will be divided into series of fine streams in passing through the openings $9^b$ and will be thus exposed to the atmosphere and cooled, thus lowering the temperature of the contents of the vessel. The provision of the double bottom insures against burning of the contents and otherwise promotes the proper cooking of the food. The cylinder $8^a$ is slightly spaced from the wall of the vessel to provide a restricted passage therebetween through which the circulatory movement of the liquid may be maintained.

Having described our invention, we claim:

1. A boiler for liquid food consisting of a vessel, an inverted funnel shaped member within the vessel and provided with a spout, a distributer plate mounted on the spout adapted to direct the flow outwardly thereof into the vessel, said distributer plate having openings in its outer edge portion to divide the flow into streams and a baffle plate mounted on said spout.

2. A boiler consisting of a vessel having an inner bottom and an outer bottom spaced over each other to provide a shallow air space therebetween, a member having a cylindrical portion provided with openings in the lower end thereof inserted in the vessel and spaced slightly therefrom to provide a restricted space between the member and the vessel, said member including a conical portion and a spout, and a distributer plate supported on the spout and provided with a horizontal plate and a surrounding upstanding flange, whereby the fluid will be distributed outwardly from said spout in a thin film, said upstanding flange having openings therein through which the fluid flows back into the vessel when the vessel is subjected to heat to raise the contents thereof to a boiling point.

3. A boiler for liquid food consisting of a vessel, an inverted funnel shaped member within the vessel and provided with a spout, said spout having an external bead, a distributer plate having a nipple, detachably fitted on said spout, said distributer plate having an upstanding flange and openings therein, and a baffle having a ring inclosing said spout and vertical portions connecting the same to the ring in spaced relation above the upper end of the spout so as to deflect the outflow through the spout over the distributer plate.

Signed by us at Springfield, Mass.
STANLEY GUMULA.
JOHN GUMULA.